Dec. 17, 1968  D. J. DOWERS  3,416,519
ANIMAL SPLINT
Filed Aug. 25, 1966  2 Sheets-Sheet 1

DAVID JOHN DOWERS,
INVENTOR.

BY Alvin E. Moore,
ATTORNEY

Dec. 17, 1968   D. J. DOWERS   3,416,519
ANIMAL SPLINT

Filed Aug. 25, 1966   2 Sheets-Sheet 2

DAVID JOHN DOWERS,
INVENTOR.

BY *Alvin E. Moore,*
ATTORNEY

United States Patent Office 3,416,519
Patented Dec. 17, 1968

3,416,519
ANIMAL SPLINT
David John Dowers, 110 Broad St., Waveland,
Miss. 39576
Filed Aug. 25, 1966, Ser. No. 575,057
12 Claims. (Cl. 128—87)

This invention pertains to an adjustable splint for injured legs of animals—especially of dogs.

Many dogs suffer broken legs and in humane civilization we try to rescue them. But the currently available type of splint is very inadequate for this purpose. It is not sufficiently adjustable and does not satisfactorily remain in place when the dog begins to frequently move about. Also the veterinarian's assembly of the splints that are currently on the market is very difficult.

Another veterinary problem pertains to the need of helping dogs that have two opposite legs that are broken. And a few dogs—particularly among German shepherds—are born with congenital hip dislocations; and there is thus an occasional need to provide their crutch-like support for a pair of their legs in walking.

In view of these facts, an object of the present invention is to provide a very adjustable splint, suitable for use on different breeds of dogs, having different widths of shoulders, and hips.

Another object is to provide an adjustable animal splint that may be easily assembled in proper fit on the animal and yet will remain securely and leg-supportingly in place, held on the injured animal's shoulder (or hip) when it begins to walk or run.

A further object is to invent an adjustable animal splint (or crutch-like device) adapted to securely support the two forelegs (or else the two hind legs) in one connected assembly of parts.

Another object is to present an adjustable, animal-splint assembly of selective, coacting parts—selective to provide either an effective splint for one injured leg or, alternatively, a splint for two, opposite injured legs.

A further object is to provide an adjustable animal splint, having connections between parts that are loose and flexible in assembly on an animal, and then may be tightened in place securely and continually to support the animal's injured leg (or legs) off the ground.

Still another object is to provide a metallic, adjustable splint, supported from an animal's shoulder (or hip), provided with effective, easily-applied and easily removed, cushioning means to prevent the animal's injury by the rubbing of metallic supports on its shoulder (or hip).

The foregoing and other objects of the invention will become more fully apparent from the following detailed description of the inventive structure and from the accompanying drawings in which.

Figure 1:
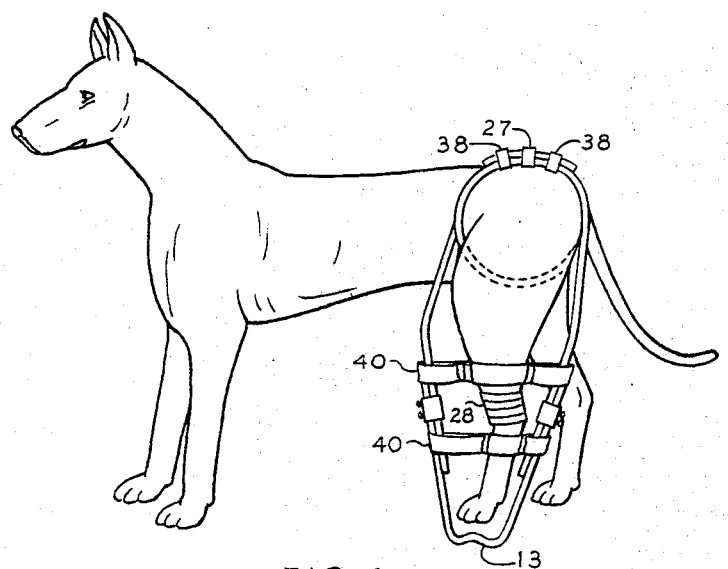
FIGURE 1 is a side elevational view of one form of the invention, shown as holding off the ground the injured hind leg of a dog.

Although the invented splint is shown in FIGURE 1 as supporting the broken left hind leg of a dog, it may be used to support any of his other legs. If the device is used on a broken front leg the upper, supporting saddle rests on the dog's shoulders instead of on his hip as shown in FIGURE 1.

Figure 2:
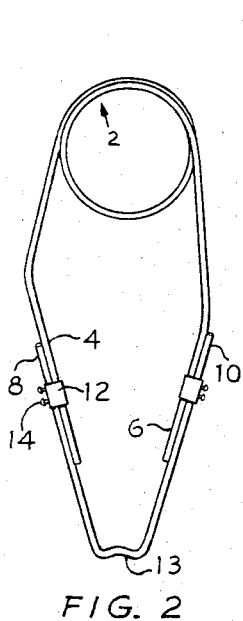
FIGURE 2 is a side elevational view of one pair of parts of the splint.
Figure 4:
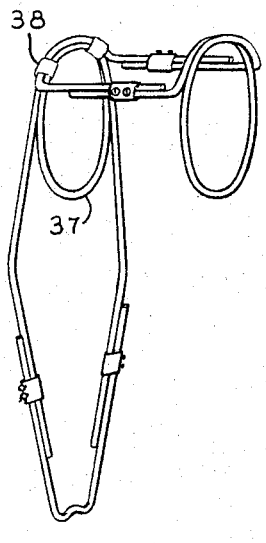
FIGURE 4 is a perspective view of the splint parts of FIGURES 2 and 3, flexibly fastened together.

The splint of the form of FIGURES 1 to 4 consists of three separable elements, adjustably joined together by connecting devices—these elements being selected by the veterinarian from an assembly of splint elements. The main member, which is bound to a broken leg, is shown in FIGURE 2. Made of metal, preferably aluminum alloy, it comprises an upper separable part composed of loop 2 and depending legs 4 and 6. The loop is sufficiently large in diameter to freely go over the whole of any leg of the general size of dog for which this large-size splint is designed. Resiliency of the legs 4 and 6 is provided by this loop, so that easily and without permanent deformation they may be moved toward or away from each other in assembly of the upper and lower parts of this leg member of the splint. The lower, separable part of the member comprises upper legs 8 and 10, adjustably fastened to legs 4 and 6 by bands or ferrules 12, a lower bent portion 13 and setscrews 14.

Figure 3:
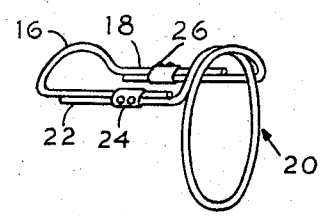
FIGURE 3 is a perspective view of two other, adjustably-connected parts of the splint.

Two other elements of the splint of FIGURES 1 to 4 are shown in FIGURE 3. One of these, adapted to be fastened to loop 2, comprises a middle, arcuate part 16, having a curvature that is concentric with that of loop 2, and a pair of horizontally projecting rod ends 18. And another element, adjustably assembled with the part 16–18 has a loop 20 and a pair of horizontally projecting rod ends 22. These parts are adjustably assembled and fastened together by means of ferrules 24 and setscrews 26.

Figure 5:
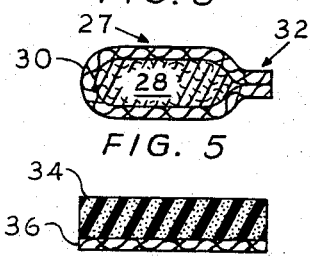
FIGURE 5 is a detail, cross-sectional view of a cushioning tape for protection of an animal's shoulder from injury by rubbing of upper splint parts.
Figure 6:
FIGURE 6 is a detail, cross-sectional view of an alternative form of the cushioning tape.
Figure 7:
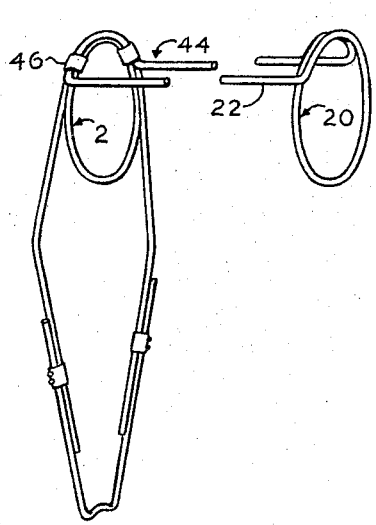
FIGURE 7 is a perspective view of two main parts of a second form of the invention, shown as about to be assembled.
Figure 8:
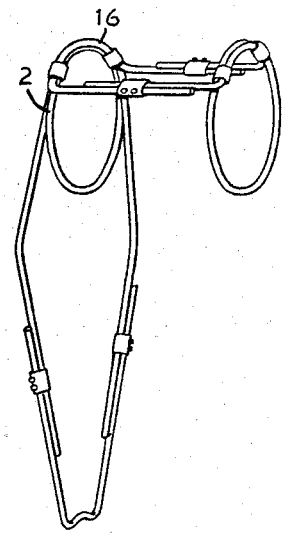
FIGURE 8 is a perspective view of the parts of FIGURE 7, adjustably assembled and fastened together by means of connecting devices.
Figure 9:
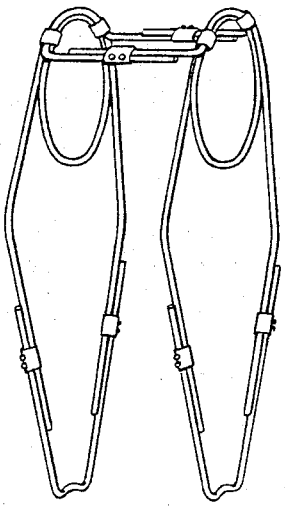
FIGURE 9 is a perspective view of a splint, utilizing the type of connections shown in FIGURE 8, adapted for the support of opposite injured legs of an animal.
Figure 10:
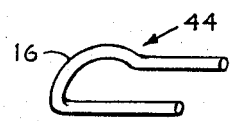
FIGURE 10 is a detail, perspective view of the upper, splint-supporting bracket shown in the left part of FIGURE 7.

A skin-protecting cushioning tape 27 is shown in FIGURE 5 as comprising a strip of cotton wadding 28 inside an envelope of folded cloth, looped at 30, with its edges stitched or glued together at 32. An alternative form of the cushioning tape is shown in FIGURE 6 as comprising a strip of foam rubber 34, which is preferably backed by a cloth strip 36. Before assembling the splint on an injured dog the lower, inner part 37 of the loop 2 and the similar part of loop 20 may be detachably enclosed or backed by lengths of this cushioning means—preferably by helically winding a length around each of the loops. Also the tape may be wound around or otherwise detachably fastened between each of the later-described connections 50–52. Optionally, the cushioning means may be attached to those portions of the rods of the device that are apt to chafe the animal's skin in the factory where the device is made; but, because of sanitary considerations the cushioning means is detachable from the rods.

In assembling these elements in the position indicated in FIGURE 1, after the broken bones of the anesthetized dog have been set and wrapped as at 28, the loop 2 is slid over the broken leg, and the pair of splint legs 8 and 10 are adjusted by sliding them in loosened ferrules 12 until the lower part 13 is a little below the dog's paw. Setscrews 14 are then tightened.

The arcuate portion 16 of element 16–18 is now placed over loop 2, and after it is adjustably fitted into the most satisfactory position relative to loop 2 and the dog's back the two arcuate parts are flexibly joined by adhesive tape 38. Then a length of the cushioning tape optionally may be wrapped around parts 16 and 2 wherever they tend to rub the dog's skin. For convenience of illustration, the cushioning tape 27 is shown in FIGURE 1 as wrapped only once around the rods, but in practice it is preferably helically wrapped over a substantial length of the rods, covering also the two wrappings 38 of adhesive tape. These wrappings of adhesive and cushioning tapes may rather easily be made by temporarily withdrawing loop 2 down a distance on the dog's leg; this loop moreover has enough play relative to the upper pit of the leg to allow the tape thus to be wrapped, until the cushioned loop forms a shock-absorbing fit between the animal's leg pit and hip (or shoulder).

Next strong adhesive tape 40 is securely wrapped around the dog's leg above and below the break and around the legs of the splint. The exact position of these splint parts relative to the dog's leg varies with different dogs and different locations of the fracture. At times the splint adjoins the dog's leg, in which event the metal rods at the leg are wrapped with lengths of the cushioning tape of FIGURE 5 or FIGURE 6. Optionally a strip of wood may be placed between the break and the splint, contacting both and further causing the broken bones to stay in rigid apposition.

Next the dog is turned over, loop 20 (with its portions that might chafe the dog's skin enveloped or wrapped in the cushioning means) is sleeved over his uninjured leg, the two rod ends or metallic legs are inserted in the loosened ferrules 24, and the span between arcuate part 16 and loop 20 is adjusted to conform to the distance across the dog's hip. The the setscrews 26 are tightened.

At this point the dog is efficiently, securely and comfortably harnessed by the splint; and he will be able to walk on the bent portion 13, with his foot above the ground, and without pressure on the broken leg. This part 13 preferably is enveloped, coated or wrapped with rubber or other flexible plastic (shown in FIGURE 14 at 42) to reduce wear on the metal and to absorb some of the shock due to the striking of part 13 against the ground or pavement. This element 42 is preferably a short section of hose of rubber or other plastic, sleeved over the rod end and held in place on it by friction or glue.

The invented splint is to be designed and marketed in at least two and preferably three general sizes. A size for the small-dog group is indicated in FIGURE 14.

A second species of the splint is shown in FIGURES 7 to 14. This form comprises: a metal bracket 44 (shown separately in FIGURE 10) that is permanently fixed to loop 2 by welding or soldering it to the loop within a pair of metallic bands 46; and rod ends 22 that are integral with loop 20, in the manner of FIGURES 1 to 4. The assembly of the parts is similar to that of the form of FIGURES 1 to 4, except that no wrapping of the arcuate parts 16 and 2 with adhesive tape is necessary.

Figure 14:
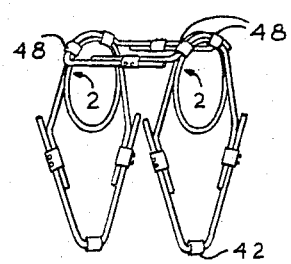
FIGURE 14 is a perspective view of a double splint of a modified form—of shorter dimensions, designed for smaller dogs.

FIGURE 14 illustrates a third form of the invention, which optionally may be made in a size larger than that indicated in this figure. This form comprises two brackets, each of which is separate from a loop 2, and in assembly on an injured animal is fastened to the loop by wrappings 48 of adhesive tape. FIGURE 14 illustrates this form of the invention as comprising a double splint, for two opposite broken legs; but if only one leg is injured one of the loops is of the type shown in FIGURES 3 and 11 at 20.

Figure 12:
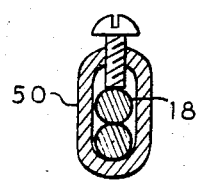
FIGURE 12 is a detail, sectional view of one form of the means for fastening the parts together in assembled, adjusted positions.
Figure 13:
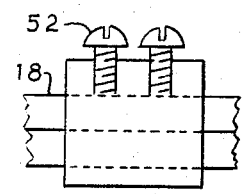
FIGURE 13 is a detail, side-elevational view of the connecting means of FIGURE 12.

One form of the adjustable connection is shown in FIGURES 12 and 13. Here the clearance between the rod end 18 and the ferrule or band 50 provides for looseness and flexibility in assembly, before the setscrews 52 are tightened.

Figure 15:
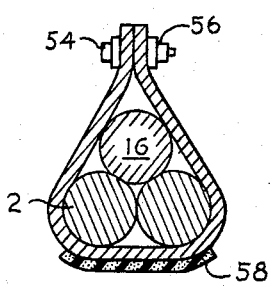
FIGURE 15 is a detail, cross-sectional view of a second form of the connection between the separable parts of the splint.
Figure 16:
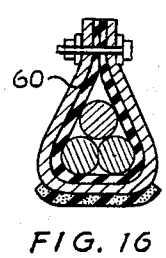
FIGURE 16 is a detail, cross-sectional view of a third form of the connection between the separable parts.

FIGURES 15 and 16 illustrate two other forms of the adjustable connection. In FIGURE 15 a clamp of spring steel is shown as drawn tightly around arcuate parts 16 and 2 (after they are adjustably fitted together) by means of bolt 54, nut 56 and a pair of washers. A piece of foam rubber, 58, is glued or otherwise detachably fastened to the base of the clamp where it rests on the dog's shoulder or hip.

The connection of FIGURE 16 differs from that of FIGURE 15 in that it comprises a lining, 60, of rubber or other flexible plastic.

Figure 11:
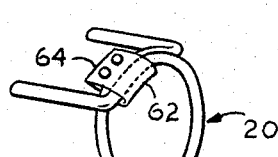
FIGURE 11 is a detail, perspective view of the separable, adjustable loop-and-bracket which supports the splint on the uninjured side of an animal's shoulder or hip, partly enveloped in a cushioning pad.

In FIGURE 11 another form of the cushioning means to prevent chafing of the skin is shown at 62. This is a band or envelope of foam rubber of the general type shown in FIGURE 6, sheathed in cloth, the joined edges of which are fastened together in a loop around the enveloped metal parts by snap fasteners 64.

Various changes may be made in illustrated structure, within the scope of the appended claims.

The following invention is claimed:

1. A device having separable, adjustably connectable elements for the support of an injured animal's leg comprising:

an element having a loop, large enough to go over and up to the pit of any leg of an animal of the general size for which the dimensions of the device are designed, and a pair of depending rods, adapted to be fastened to the animal's leg, having upper portions that are fixed to said loop and converging lower portions, at least parts of said rods being movable toward or away from each other;

a second element comprising a pair of upright, divergent rods, joined by a cross rod at their bottom ends which is adapted to be positoned below the animal's foot and to rest on the ground, said divergent rods being adjacent to said convergent rods;

connecting means comprising holding means to envelop each adjacent pair of the convergent and divergent rods with sufficient clearance for adjusting movement of these rods relative to each other, and screw-threaded means for tightening and fixing said holding means about the rods in their adjusted position;

a third element having a pair of projecting legs adapted to rest horizontally on a top portion of the animal's back and a middle arcuate part to which the projecting legs are fixed, said arcuate part having a curvature which fits that of the upper portion of said loop;

and a member comprising a second loop, adapted and large enough to go over and up to the pit of the opposite leg of the animal, and a pair of projecting legs that are fixed to said second loop, adapted to rest substantially horizontally on a top portion of the animal's back and to be adjacent to said first-named pair of projecting legs; and connecting means comprising holding means to envelop said four projecting legs, with sufficient clearance for adjusting movement of the legs relative to each other, and screw-threaded means for tightening and fixing said holding means about the projecting legs in their adjusted position.

2. A device as set forth in claim 1, in which at least the major portion of said loops, rods, projecting legs and connections are of metal.

3. A device as set forth in claim 1, in which said first-named loop is resilient and comprises a pair juxtaposed convolutions, and in which each of said depending rods is fixed to one of said convolutions.

4. A device as set forth in claim 1, in which each of said loops is resilient and comprises a pair of juxtaposed convolutions, and in which each of said depending rods is fixed to one of the convolutions of said first-named loop.

5. A device as set forth in claim 1, in which said first-named element further comprises cushioning means to prevent skin-chafing by said first-named loop, attached to this loop, and having a softly flexible portion between the loop and the top of said animal.

6. A device as set forth in claim 5, in which said cushioning means comprises helically-wound convolutions around portions of said first-named loop, each of said convolutions comprising a length of cotton wadding within an envelope of cloth.

7. A device as set forth in claim 5, in which said member further comprises cushioning means to prevent skin-chafing by said second loop, attached to this second loop, and having a softly flexible portion between the second loop and the top of said animal.

8. A device as set forth in claim 7, in which said cushioning means comprises flexible portions of yieldable, porous material and means for detachably fastening said portions to said loops.

9. A device as set forth in claim 8, in which said cushioning means futher comprises flexible portions of yieldable, porous material between each of said connections and the top of said animal and means for detachably fastening said last-named portions to the connections.

10. A device as set forth in claim 1 in which each of said holding means comprises a metallic band which is of sufficient extent around rods of said device to provide a clearance relative to the rods in their adjustment, but is of such size as to permit said screw-threaded means to contact at least one of the legs and to hold the legs tightly together.

11. A device as set forth in claim 1 which further comprises, for protection of said cross rod against wear, a plastic-tubing sleeve that envelops and is fixed to the cross rod.

12. A device as set forth in claim 1, adapted to support two opposite legs of an injured animal, in which said member further comprises a second pair of depending rods, adapted to be fastened to the animal's leg that is opposite to said first-mentioned leg, having upper portions that are fixed to said loop and converging lower portions, and a pair of ground-engaging upwardly projecting rods, at least parts of said last-named rods being movable toward or away from each other, and screw-threaded means for tightening and fixing said holding means about the last-named legs in their adjusted position.

References Cited

UNITED STATES PATENTS

| 2,260,216 | 10/1941 | Doyle | 128—85 |
| 2,302,868 | 11/1942 | Invidiato | 128—87 |
| 3,277,889 | 10/1966 | Palmer | 128—87 |

FOREIGN PATENTS

| 293,888 | 7/1928 | Great Britain. |
| 483,785 | 4/1938 | Great Britain. |

LAWRENCE W. TRAPPS, *Primary Examiner.*